MULTISTATION DUPLEX SYSTEM

Filed Jan. 14, 1949 2 SHEETS—SHEET 1

Fig. I.

WITNESSES:
Robert A. Baird
Wm. C. Groome

INVENTORS
Paul L. Newbury &
Robert C. Cheek.
BY
Hyman Diamond
ATTORNEY

MULTISTATION DUPLEX SYSTEM

Filed Jan. 14, 1949 2 SHEETS—SHEET 2

WITNESSES:
Robert C. Baird
Wm. C. Groome

INVENTORS
Paul L. Newbury &
Robert C. Cheek.
BY
Hymen Diamond.
ATTORNEY

Patented Jan. 20, 1953 2,626,319

UNITED STATES PATENT OFFICE 2,626,319

MULTISTATION DUPLEX SYSTEM

Robert C. Cheek, Irwin, Pa., and Paul L. Newbury, East Aurora, N. Y., assignors to Westinghouse Electric Corporation, East Pittsburgh, Pa., a corporation of Pennsylvania Application January 14, 1949, Serial No. 70,854

16 Claims. (Cl. 179—2.5)

Figure 1:
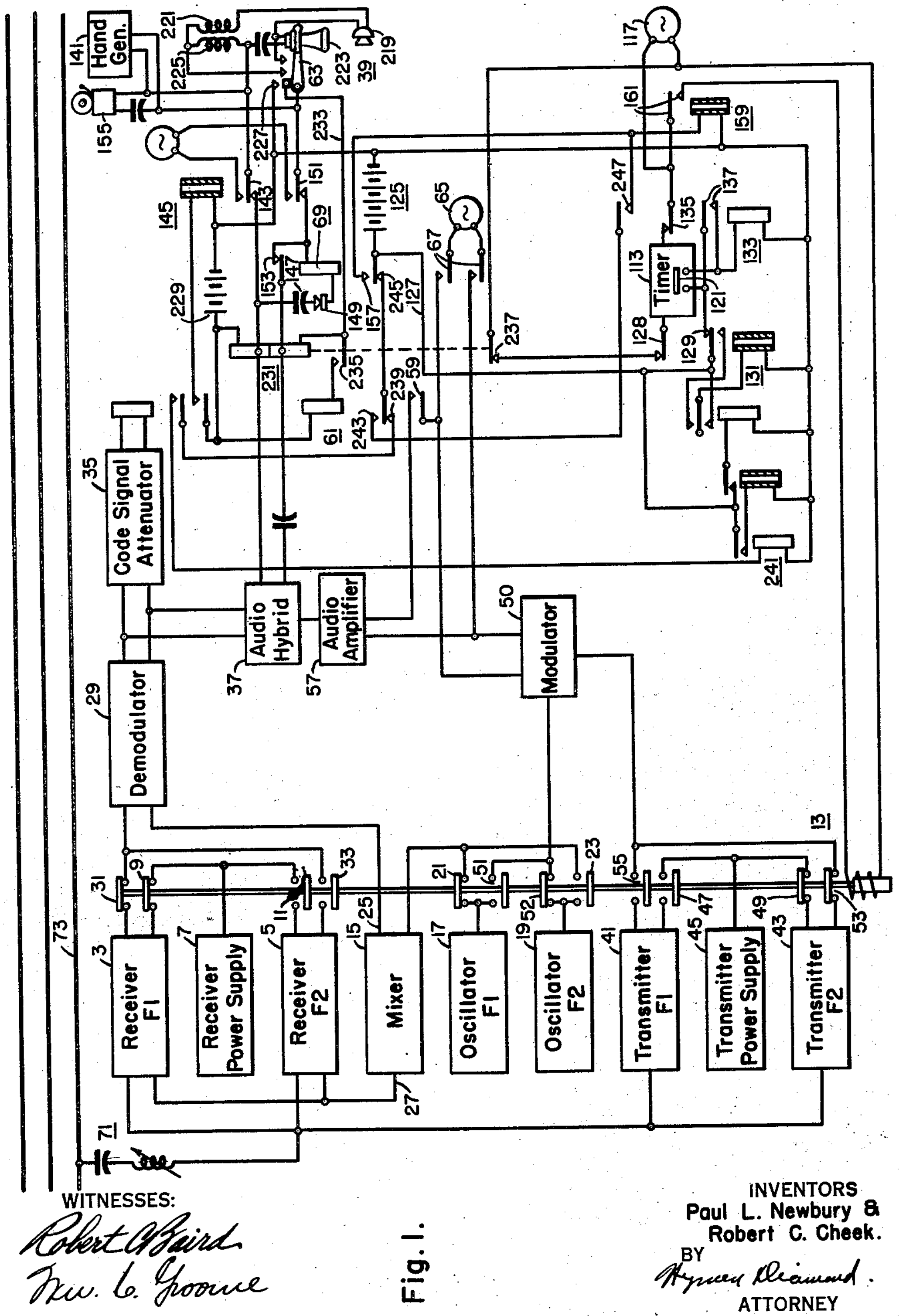

Our invention relates to communication apparatus, and it has particular relation to multi-station, point-to-point, two-way communication sets.

Each station of a multi-station, two-way, carrier communication system includes two transmitters designed to operate at different frequencies and two receivers designed to operate at the same frequencies. In the quiescent state, each station is set to receive one frequency, say F1, and to transmit the other frequency F2. A station about to call another station is converted to transmit on frequency F2 and receive on frequency F1.

In such two-way carrier current communication systems, the receiving station must be properly set up for reception. Among other items, the operator must be notified of the incoming call and the receiving frequency F2 must be maintained. In a communication system in which the carrier is transmitted, this setting up function may be performed effectively by the unmodulated carrier.

In recent times, single side-band suppressed carrier transmission has been widely adopted for two-way carrier current communication systems. In such systems, the unmodulated carrier is not transmitted, and is not available to perform the setting up function. There may, moreover, be communication systems in the operation of which the unmodulated carrier is transmitted but, for one reason or another, cannot conveniently be used for setting up.

It is, accordingly, broadly an object of our invention to provide in a two-way carrier current communication system control apparatus for setting up the receiving stations to receive a call.

Another object of our invention is to provide a single (or double) side-band, suppressed carrier, carrier current communication system in which each of the stations shall be provided with control apparatus for setting up a remote station for reception.

A more specific object of our invention is to provide a single or double side-band, amplitude modulated multi-station, carrier-current communication system of the duplex type in which the independent stations shall include control apparatus for setting up remote stations for reception independently of any carrier.

Another specific object of our invention is to provide in a two-way communication system of the duplex type control apparatus in each station for providing a ringing signal at a remote station and for setting up the transmitters and receivers of each of the stations for communication.

In accordance with our invention, we provide a duplex communication system in which a transfer relay is provided at each station for selecting for operation one of a pair of transmitters designed to send at different frequencies, say F1 and F2, and one of a pair of receivers designed to receive at the same frequencies. In the quiescent state, all stations are set to send at one of the frequencies, say F1, and receive at the other F2. When a station is to transmit, the operator causes the transfer relay to be actuated to disable the transmitter and receiver set for transmission and reception in the quiescent state and enable the other transmitter and receiver. Once so set up, the transmitting station transmits a code signal. The code signal causes a bell to ring and actuates a switching mechanism to block operation of the transfer relay at the remote station. When the operator at the remote station hears the ring and picks up his instrument, the remote station is locked in for communication. The sending station is locked in for communication when its operator picks up his instrument.

Figure 2:
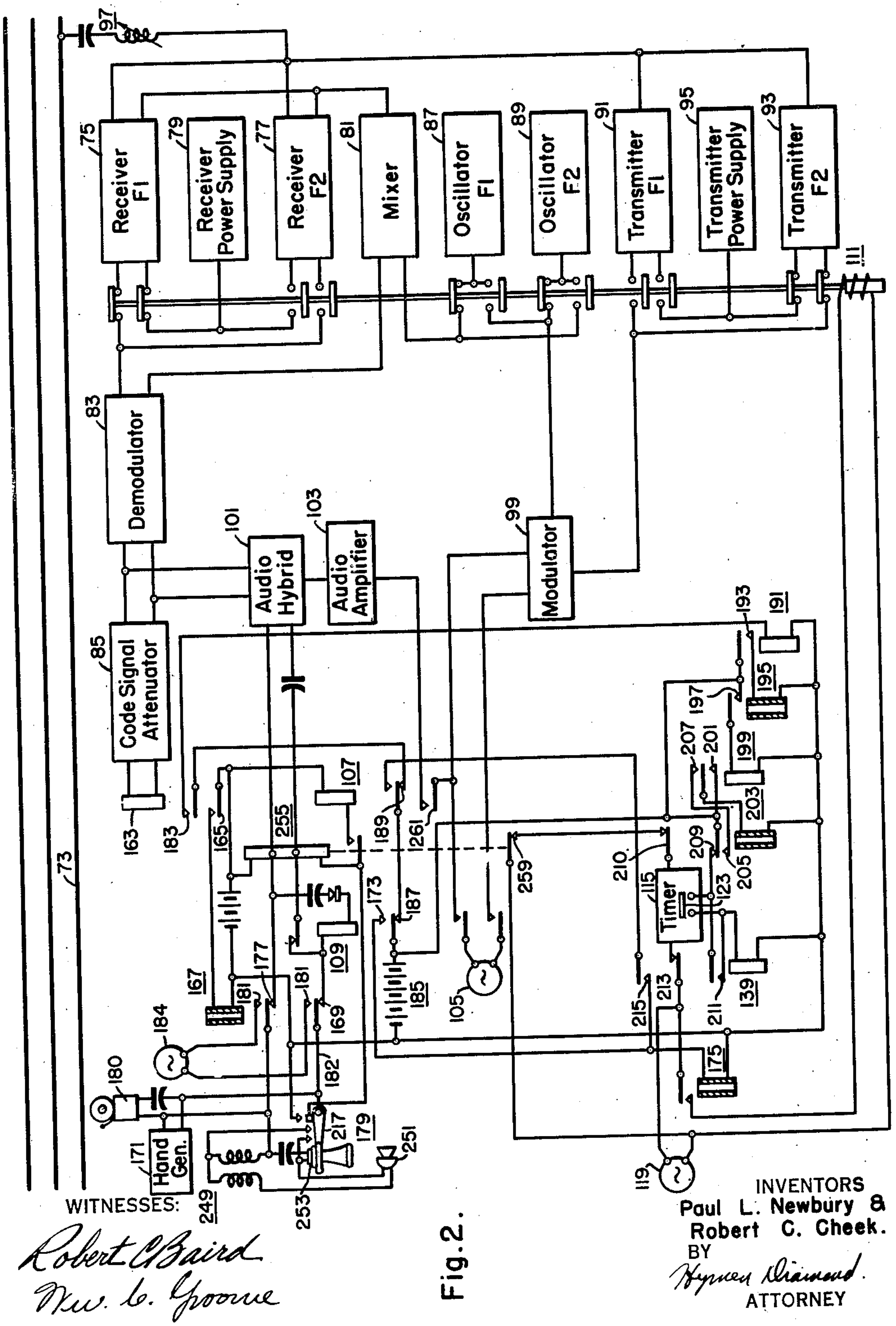

The novel features that we consider characteristic of our invention are set forth with particularity in the appended claims. The invention itself, however, both as to its organization and method of operation, together with additional objects and advantages thereof, will best be understood from the following description of a specific embodiment when read in connection with the accompanying drawings, in which:

Figure 1 is a circuit diagram of a typical station of a duplex, single side-band, suppressed carrier communication system in accordance with our invention; and Fig. 2 is a circuit diagram of another station of this communication system.

The station shown in Figure 1 includes a receiver 3 designed to operate at a frequency F1 and a second receiver 5 designed to operate at a frequency F2. Each receiver is designed to receive the modulated carrier frequency which may be designated $F1+Fm$ or $F2+Fm$ (assuming that the upper side-band is transmitted). Each receiver includes a local oscillator which may have a frequency $F1+Fi$ for one and $F2+Fi$ for the other. A power supply 7 is provided for energizing receivers F1 and F2. The power supply 7 may be applied to receiver F1 or F2, through the contacts of 9 or 11 respectively of a transfer relay 13, in dependence upon the position of this relay. In the quiescent state of the station, the relay 13 is deenergized and the power supply 7 is connected to energize receiver F1.

The station also includes a pair of oscillators 17 and 19 tuned to frequencies F1 and F2 respectively. These oscillators may be connected to a mixer 15 through contacts 21 and 23 of the relay 13. With the relay deenergized oscillator F1 is connected to, and oscillator F2 is disconnected from the mixer 15. The mixer 15 is connected at one of its terminals 27 to the local oscillators of receivers F1 and F2 and receives from these oscillations of frequency $F1+Fi$ or $F2+Fi$. The output terminal 25 of the mixer 15 is connected to a demodulator 29 and supplies to it oscillations of frequency $Fi$. Frequency $Fi+Fm$ is derived at the outputs of the receivers F1 and F2. This output may be connected to the demodulator 29 through contacts 31 and 33 of the relay 13. In the quiescent state of the station receiver 3 is connected to, and receiver 5 is disconnected from, the demodulator. The demodulator converts the signals supplied to an audio signal of frequency $Fm$. One branch of the output of the demodulator 29 is connected to a code signal attachment 35 and the other branch through an audio hybrid 37 to the sound-electric energy conversion instrument 39 of the station.

The station also includes a pair of transmitter output amplifiers; one (41) designed to operate at frequency F1 and the other (43) at frequency F2. One or the other of these transmitters may be connected to a power supply 45 through contacts 47 and 49 of the relay 13 and in the quiescent setting of the station transmitter F2 is connected and transmitter F1 is disconnected. In dependence upon the setting of the transfer relay 13, one or the other of the transmitter amplifiers 41 or 43 is connected to receive the output of a modulator 50. This modulator is supplied from the output of the oscillators F1 or F2, 17 or 19, through contacts 51 or 52 respectively, in dependence upon the setting of the transfer relay. With the transfer relay in the deenergized condition, when the station is quiescent, the modulator 50 is connected to the oscillator F2 through a normally closed contact 53; it may be connected to the transmitter F1 through another contactor 55 when the relay 13 is energized. The output of an audio amplifier 57 may be connected to the modulator 50 through a normally open contact 59 of a relay 61 which is actuated to lock in the system for communication by removal of the instrument 39 from its support 63. The audio amplifier 59 is connected to the instrument 39 through the audio hybrid 37. The input of the modulator 50 may also be connected to a generator 65 which produces a signal for operating the bell at a remote station through normally open contact 67 of a relay 69 which is actuated when a call is being initiated.

Receivers F1 and F2 and transmitters F1 and F2 are, in accordance, connected through a resonant network 71 to a power line 73. The receivers may also be connected to an antenna designed to transmit an omnidirectional or a beamed signal. In the latter event the proper duplexers must be included in the connections between the antennas and the receivers and transmitters, or separate antennas must be provided.

The station shown in Fig. 2 is similarly provided with receivers F1 and F2, 75 and 77 respectively, a power supply 79, a mixer 81, a demodulator 83, and a code signal attachment 85 common to the receivers. The station shown in Fig. 2 also includes oscillators F1 and F2, 87 and 89 respectively, transmitter amplifiers F1 and F2, 91 and 93 respectively, and a power supply 95 for these amplifiers. The inputs of the receivers F1 and F2, and the outputs of the transmitters F1 and F2 are connected to the power line 73 through a resonant network 97. The station shown in Fig. 2 is further provided with a common modulator 99, and audio hybrid 101 and an audio amplifier 103. It includes a ringing modulation generator 105 and associated relays 107 and 109 as at the Fig. 1 station. There is also a transfer relay 111 which is deenergized in the quiescent state of the station so that receiver F1 is set for receiving and transmitter F2 is set for sending.

Each of the stations also includes a synchronous timer 113 and 115 respectively which is energized from an alternating power supply 117 and 119 respectively. This timer may be a clock mechanism or an electronic timer. Initially, the operating contact 121 and 123 of the timer 113 and 115 is open. When power is supplied to a station, for example the station shown in Fig. 1, a circuit is closed which extends from a terminal of the alternating current supply 117, through normally closed contacts 135 of a relay 133, the operating coil of the timer 113, normally closed contacts 128 of slow drop-out relay 131, normally closed contacts 237 of double coil relay 231 to the other terminal of supply 117. When, after a time delay, the operating contact 121 of the timer 113 closes, a circuit is closed which extends from a positive terminal of a direct current supply 125 through a conductor 127, normally closed contacts 129 of a slow drop-out relay 131, the timer contact 121, the exciting coil of a relay 133, which when deenergized blocks operation of the transfer relay 13 to the negative terminal of the supply 125. The blocking relay 133 is actuated and at one of its contacts 135 now opens to the energizing circuit for the timer 113. The timer is deenergized, and its operating contact 121 opens. The blocking relay 133 remains energized through a lock-in contact 137 which is now closed. At the station shown in Fig. 2 a blocking relay 139 is similarly actuated.

In Figs. 1 and 2, several of the components such as the receivers, transmitters, power supply and oscillators are represented by blocks 3, 5, 7, 75, 77, 79, 41, 43, 45, 91, 93, 95, 17, 19, 87, 89, 29, 83, 35, 85, 37, 101, 50, 99, 57, 103. The blocks are used to simplify and shorten the description of the apparatus. Components corresponding to the blocks are shown in detail in the following publications:

Receiver—Westinghouse leaflet I. B. 84–797–1A, dated September 1, 1948, entitled "Single Side Band Receiver."

Transmitter—Westinghouse leaflet I. B. 84–796–1A, dated November 1, 1948, entitled "Single Side Band Transmitters."

Modulator, demodulator, mixer and oscillator—Westinghouse leaflet I. B. 84–795–1A, dated November 1, 1948, entitled "Single Side Band Units."

Code signal attachment—Westinghouse leaflet 84–755, dated January 1946, entitled "Code Signal Attachment."

Audio hybrid—Westinghouse leaflet 84–751, dated January 1946, entitled "Audio Hybrid."

Let us assume that the operator, at the station shown in Fig. 1, desires to communicate with the operator at the station shown in Fig. 2. The former then actuates a hand generator 141 causing current to flow from one terminal of the hand generator through a normally closed contact 143 of a slow drop-out relay 145, a capacitor 147, a rectifier 149, the coil of the initiating relay 69, another normally closed contact 151 of the slow relay 145, to the other terminal of the hand generator. The initiating relay 69 picks up. At one of the now open contacts 153 of this relay, the circuit between the audio hybrid 37 and the hand generator 141 is opened so that the ringing voltage from hand generator 141 will not be impressed upon the audio amplifier 57 through audio hybrid 37. At another of the now closed contacts 157 of the initiating relay 69, a circuit is closed which extends from one terminal of a direct current supply 125 through the coil of a slow drop-out relay 159 to the other terminal. This latter relay is now actuated, closing at its now closed contact 161, a circuit from the alternating power supply 117 through the exciting coil of the transfer relay 13. The transfer relay 13 is then actuated, disconnecting receiver F1 from the power supply 7 and the demodulator 29, oscillator F1 from the mixer 15, transmitter F2 from the power supply 45, and oscillator F2 from the modulator 50 and connecting receiver F2 to the power supply 7 and the modulator 29, oscillator F2 to the mixer 15, oscillator F1 to the modulator 50, and transmitter F1 to the power supply 45. The slow-release relay continues to hold closed the circuit through the exciting coil of the transfer relay 13 after the operation of the hand generator stops. The operator at the sending station turns the hand generator 141 on and off for short and long intervals in accordance with a pre-established code system . The number and sequence of these intervals identify the desired receiving station. As the hand generator is turned on and off, the initiating relay is energized and deenergized and its contacts are opened and closed. However, the slow relay 159 and the transfer relay 13 remain actuated throughout.

When the initiating relay 69 is energized at the sending station, it also closes the contacts 67 which connect the ringing modulation generator 65 to the modulator 50. The ringing code is, therefore, transmitted by transmitter F1. Receiver F1 (75) at the receiving station receives this code signal and at the output of the receiving code signal attachment 85 a series of long and short pulses are produced. A relay 163 at the output of the attachment 85 is actuated repeatedly for long or short intervals in accordance with the code. At a now closed contact 165 of this code relay 163, a circuit through the exciting coil of a slow drop-out relay 167 is closed.

At now open contacts 169 and 177 of this slow relay 167, and now closed contacts 181, the telephone line 182 is transferred from the audio hybrid 101 to the source of ringing power 184. The circuit from the hand generator 171 through the initiating relay 109 at the receiving station is also opened. The operator at the receiving station cannot, therefore, energize his initiating relay 109 by actuating the hand generator 171. Since the initiating relay 109 cannot be energized, the circuit through its normally open contact 173 and the coil of the slow-acting relay 175 which controls the transfer relay 111 cannot be closed. For the time being, therefore, the transfer relay 111 cannot be actuated and the receiving station is set to receive signals transmitted on frequency F1.

The energizing circuit for the bell 180 at the receiving station is closed at a pair of now closed contacts 181 of the slow relay 167, and the bell rings. The slow relay 167 is energized and deenergized for long and short intervals in accordance with the code sent and a sequence of long and short rings are produced.

At another now closed contact 183 of the code relay 163 at the receiver station, a circuit is closed which extends from the positive terminal of a power supply 185 through a normally closed contact 187 of the initiating relay 109, a normally closed contact 189 of the relay 107, which when energized locks in the system for sending, the now closed contact 183 of the code relay 163, and the exciting coil of the first relay 191 of a relay chain. The first chain relay 191 is actuated; at its now closed contact 193, closes a circuit from the positive terminal of the supply 185 through the exciting coil of an auxiliary slow drop-out relay 195 of the chain. At a now closed contact 197 of the slow relay 195, a circuit is closed through the exciting coil of a wiggle-stick relay 199 of the chain. Through one of the repeatedly closing contacts 201, of the wiggle-stick relay, a circuit is closed through the exciting coil of a second slow drop-out relay 203 of the chain. At its now closed contact 205, this slow relay 203 is locked in through the other repeatedly closing contact 207 of the wiggle-stick relay 199 so long as the movable contact of the latter continues to vibrate. At a now open contact 209 of the second slow relay 203, the lock-in circuit for the blocking relay 139 is broken. The relay chain 191, 195, 199 and 203 maintains this circuit through the exciting coil of the blocking relay 139 open continuously while the bell rings and independently of the discontinuity of the code.

At a now open contact 210 of the slow relay 203 the circuit through the timer 115 is maintained open. The timing operation of the timer cannot start, therefore, until after slow relay 203 is deenergized, that is, after the ringing stops.

When the blocking relay is deenergized, its lock-in contact 211 opens; its normally closed contact 213 in series with the timer closes, and its contact 215 in series with the coil of the slow-acting relay 175 which controls the transfer relay 111 is opened. The slow relay 175 cannot therefore be energized through this contact 215. After the transmission of the code signal stops, the chain of relays 191, 195, 199, 203 is also deenergized and the normally closed contact 210 of the second auxiliary slow relay 203 in series with the timer 115 is closed. Since contact 213 of the blocking relay is closed the timer circuit now begins its timing operation. This operation continues from 5 to 45 seconds and after the time interval, the timer contact 123 closes, reenergizing the blocking relay 139 unless the receiving operator has removed his instrument 179 from its support 217.

The operator at the transmitting station continues to operate his hand generator 141 intermittently and to ring the bell 180 at the receiving station intermittently. After he has actuated the hand generator at least through one complete code, the operator at the transmitting station removes his instrument 39 from its support 63. The removal of the instrument 39 closes one circuit through the mouthpiece mechanism 219, and the primary 221 of an audio transformer and a second circuit through the earpiece mechanism 223 and the secondary 225 of this transformer. The operator at the sending station may now speak into, and receive speech through, his instrument 39.

Through another contact 227 of the instrument support 63, a circuit is closed which extends from one terminal of a direct current supply 229 through the exciting coils of a double coil relay 231, a conductor 233, the contact 227 to the supply. Through a now closed contact member 235 of this relay 231 and the contact 227, a second circuit is closed through the exciting coil of the communication lock-in relay 61. At a now open contact 237 of the double coil relay 231, the circuit through the sending station timer 113 is opened and timing operation of the timer is prevented.

At a now open contact 239 of the lock-in relay 61 a second open gap is produced in the circuit through the exciting coil of the first relay 241 of the relay chain at the sending station. Operation of this relay 241 by code signals which may be received accidentally is, therefore, prevented.

At a now closed contact 243 of the lock-in relay 61, a circuit is closed which extends from the source 125, through the normally closed contact 245 of the initiation relay 69 which is now deenergized, the now closed contact 243 of the lock-in relay, the still closed contact 247 of the still actuated blocking relay 133, the exciting coil of the slow relay 159 which controls the transfer relay 13 to the supply. The slow relay 159 is now locked in its energized condition so long as the instrument 39 remains removed from its support.

Because the slow relay 159 is not immediately releasable, the transfer relay 13 remains energized for the short time interval between the actuation of the hand generator and the removal of the instrument 39 from its support 63. However, even if the transfer relay should be deenergized by drop-out of the slow relay before removal of the instrument 39, the transfer relay would be reclosed by actuation of the lock-in relay 61 and subsequent reactuation of the slow relay 159.

At the now closed contact 59 of the lock-in relay 61, the audio amplifier 57 is connected to the modulator 50. The signal from the secondary of the audio output transformer 221—225 when the operator speaks, now flows through the hybrid 37 and the audio amplifier 57 to the modulator 50 and is transmitted at frequency F1.

At the receiving station, the operator on hearing his bell 180 removes his instrument 179 from its support 217. He performs this act before the timer 115 has been actuated and relay 139 has been reenergized. If he does not, the calling operator continues to operate his hand generator 141 thus maintaining the receiving station in condition for reception until the instrument 179 is picked up within the timing interval. The circuits through the receiving station audio transformer 249 and the mouthpiece and earpiece mechanisms 251 and 253, respectively, are closed in the same manner as at the sending station. In the same manner as at the sending station, a circuit is also closed through the exciting coils of a double coil relay 255 and a lock-in relay 107 is energized. At the now open contact 259 of the double coil relay 255 the circuit through the timer 115 is opened. The timer does not, therefore, close its contact 123 to actuate blocking relay 139 so long as the receiving instrument 179 is removed from its support 217. The closing of the contact 261 of the lock-in relay 107 in series with the coil of the slow relay does not, therefore, cause a circuit to be closed through the slow relay and the transfer relay remains unenergized. The receiving station continues to be set at receiving frequency F1 and transmitting frequency F2. Since the lock-in relay is actuated, the audio amplifier 103 is connected to the modulator 99 and the speech of the operator at the receiving station can transmit at frequency F2.

The sending station may be re-set for calling or receiving by the replacement of the instrument 39 in its support 63. Under such circumstances, the lock-in relay 61 is deenergized and both the slow-release and the associated transfer relays 159 and 13, respectively, are deenergized.

When the instrument 179 at the receiving station is replaced on its support 217 the double coil and lock-in relays 255 and 107 are deenergized, contact 259 recloses, the timer 115 times out and blocking relay 139 is reset. The receiving station may now call or receive.

While we have shown and described a specific embodiment of our invention, we are fully aware that many modifications thereof are possible. Our invention, therefore, is not to be restricted except insofar as is necessitated by the prior art and by the spirit of the appended claims.

We claim as our invention:

1. A communication set including a first single side band transmitter designed to operate at a frequency F1 and to transmit a side band only at said frequency F1, a second single side band transmitter designed to operate at a frequency F2 which differs from the frequency F1 and to transmit a side band only at said frequency F2, a first receiver designed to operate at said frequency F2, a second receiver designed to operate at said frequency F2, standby connections enabling receiver F1 and transmitter F2 and disabling receiver F2 and transmitter F1, and connections responsive to a locally generated signal for disabling receiver F1 and transmitter F2 and for enabling receiver F2 and transmitter F1.

2. A communication set comprising an instrument for effecting a conversion between sound and electric energy, a support for said instrument, a single side band receiver designed to operate at a frequency F1, another single side band receiver designed to operate at a frequency F2 which differs from F1, a single side band transmitter designed to operate at said frequency F1, another single side band transmitter designed to operate at said frequency F2, first connections for enabling said F1 receiver and said F2 transmitter and disabling said F2 receiver and said F1 transmitter, means for producing locally a signal while said instrument is on said support, second connections responsive to said locally produced signal for disabling receiver F1 and transmitter F2 and for enabling receiver F2 and transmitter F1 so long as said signal is being produced and while said instrument remains on said support, and third connections responsive to the removal of said instrument from said support, for maintaining said F1 receiver and F2 transmitter disabled and said F2 receiver and F1 transmitter enabled after said signal has been interrupted and so long as said instrument remains removed from said support.

3. A communication set including a first single side band transmitter designed to operate at a frequency F1, a second single side band transmitter designed to operate at a frequency F2 which differs from the frequency F1, a first single side band receiver designed to operate at said frequency F1, a second single side band receiver designed to operate at said frequency F2, standby connections enabling receiver F1 and transmitter F2 and disabling receiver F2 and transmitter F1, and connections responsive to a locally generated signal for disabling receiver F1 and transmitter F2 and for enabling receiver F2 and transmitter F1 and for causing said F1 transmitter to transmit a second signal.

4. A communication set comprising an instrument for effecting a conversion between sound and electric energy, a support for said instrument, a single side band receiver designed to operate at a frequency F1, another single side band receiver designed to operate at a frequency F2 which differs from F1, a single side band transmitter designed to operate at said frequency F1, another single side band transmitter designed to operate at said frequency F2, first connections for enabling said F1 receiver and said F2 transmitter and disabling said F2 receiver, and said F1 transmitter, second connections responsive to a locally produced signal for disabling receiver F1 and transmitter F2 and for enabling receiver F2 and transmitter F1 and for causing said F1 transmitter to transmit a second signal so long as said signal is being produced, and third connections responsive to the removal of said instrument from said support, for maintaining said F1 receiver and F2 transmitter disabled and said F2 receiver and F1 transmitter enabled after said first-mentioned signal has been interrupted and so long as said instrument remains removed from said support.

5. A communication set comprising an instrucment for effecting a conversion between sound and electric energy, a support for said instrument, a single side band receiver designed to operate at a frequency F1, another single side band receiver designed to operate at a frequency F2 which differs from F1, a single side band transmitter designed to operate at said frequency F1, another single side band transmitter designed to operate at said frequency F2, first connections for enabling said F1 receiver and said F2 transmitter, and disabling said F2 receiver and said F1 transmitter, second connections responsive to a locally produced signal for disabling receiver F1 and transmitter F2 and for enabling receiver F2 and transmitter F1 and for causing said F1 transmitter to transmit a second signal so long as said signal is being produced, and third connections responsive to the removal of said instrument from said support, for maintaing said F1 receiver and F2 transmitter disabled and said F2 receiver and F1 transmitter enabled after said first-mentioned signal has been interrupted and connecting said F1 transmitter to transmit sound impressed on said instrument, said F1 transmitter and F2 receiver being maintained enabled and said F2 transmitter and F1 receiver disabled and said F1 transmitter being connected to transmit sound so long as said instrument remains removed from said support.

6. A communication set including a first transmitter designed to operate at a frequency F1, a second transmitter designed to operate at a frequency F2 which differs from the frequency F1, a first receiver designed to operate at said frequency F1, a second receiver designed to operate at said frequency F2, standby connection enabling receiver F1 and transmitter F2 and disabling receiver F2 and transmitter F1, additional connections for disabling receiver F1 and transmitter F2 and enabling receiver F2 and transmitter F1, local manually operable means for causing said additional connections to disable receiver F1 and transmitter F2 and to enable receiver F2 and transmitter F1, and circuit means connected to receiver F1 for causing said additional connections to respond to a signal received by receiver F1 from a remote point to maintain said receiver F1 and transmitter F2 enabled and receiver F2 and transmitter F1 disabled at least for a predetermined time interval independently of the operation of said manually operable means.

7. A communication set including a first transmitter designed to operate at a frequency F1, a second transmitter designed to operate at a frequency F2 which differs from the frequency F1, a first receiver designed to operate at said frequency F1, a second receiver designed to operate at said frequency F2, stand-by connections enabling receiver F1 and transmitter F2 and disabling receiver F2 and transmitter F1, first connections for disabling receiver F1 and transmitter F2 and for enabling receiver F2 and transmitter F1, means responsive to a locally generated signal for causing said first connections to perform said above-described disabling and enabling functions, second connections for preventing said first connections from performing the above-described disabling and enabling operations and means responsive to a signal received from a remote point before said locally generated signal is produced for causing said second connections to perform its preventing operation.

8. A communication set including a first transmitter designed to operate at a frequency F1, a second transmitter designed to operate at a frequency F2 which differs from the frequency F1, a first receiver designed to operate at said frequency F1, a second receiver designed to operate at said frequency F2, stand-by connections enabling receiver F1 and transmitter F2 and disabling receiver F2 and transmitter F1, first connections for disabling receiver F1 and transmitter F2 and for enabling receiver F2 and transmitter F1, means responsive to a locally generated signal for causing said first connections to perform said above-described disabling and enabling functions, second connections for preventing said first connections from performing the above-described disabling and enabling operations, said second connections including a timing mechanism for maintaining its above-described preventing function for at least a predetermined time interval after said remote signal has been interrupted, and means responsive to a signal received from a remote point before said locally generated signal is produced for causing said second connections to perform its preventing operation for said time interval.

9. A communication set comprising an instrument for effecting a conversion between sound and electric energy, a support for said instrument, a receiver designed to operate at a frequency F1, another receiver designed to operate at a frequency F2 which differs from F1, a transmitter designed to operate at said frequency F1, another transmitter designed to operate at said frequency F2, first connections for enabling said F1 receiver and said F2 transmitter and disabling said F2 receiver and said F1 transmitter, second connections for disabling receiver F1 and transmitter F2 and for enabling receiver F2 and transmitter F1, means responsive to a locally produced signal for causing said first connections to perform its functions as aforesaid so long as said signal is being produced, third connections for maintaining said F1 receiver and F2 transmitter disabled and said F2 receiver and F1 transmitter enabled after said signal has been interrupted, means responsive to the removal of said instrument from said support for causing said third connections to perform said aforesaid functions so long as said instrument remains removed from said support, fourth connections for preventing the above-described functioning of said third connections, and means responsive to a signal received from a remote point when said signal is received prior to removal of said instrument from said support for causing said fourth connections to function as aforesaid.

10. A communication set comprising an instrument for effecting a conversion between sound and electric energy, a support for said instrument, a receiver designed to operate at a frequency F1, another receiver designed to operate at a frequency F2 which differs from F1, a transmitter designed to operate at said frequency F1, another transmitter designed to operate at said frequency F2, first connections for enabling said F1 receiver and said F2 transmitter and disabling said F2 receiver and said F1 transmitter, second connections for disabling receiver F1 and transmitter F2 and for enabling receiver F2 and transmitter F1, means responsive to a locally produced signal for causing said second connections to function as aforesaid so long as said signal is being produced, third connections for maintaining said F1 receiver and F2 transmitter disabled and said F2 receiver and F1 transmitter enabled after said signal has been interrupted, means responsive to the removal of said instrument from said support for causing said third connections to function as aforesaid so long as said instrument remains removed from said support, fourth connections for preventing the above-described functioning of said third connections, said fourth connections including a timer for maintaining the above-described functioning thereof for at least a predetermined interval after said remote signal has been interrupted, and means responsive to a signal received from a remote point if said signal is received prior to removal of said instrument from said support for causing said fourth connections to function as aforesaid for said interval.

11. A communication set comprising an instrument for effecting a conversion between sound and electric energy, a support for said instrument, a receiver designed to operate at a frequency F1, another receiver designed to operate at a frequency F2 which differs from F1, a transmitter designed to operate at said frequency F1, another transmitter designed to operate at said frequency F2, first connections for enabling said F1 receiver and said F2 transmitter and disabling said F2 receiver and said F1 transmitter, second connections for disabling receiver F1 and transmitter F2 and for enabling receiver F2 and transmitter F1, means responsive to a locally produced signal for causing said second connections to function as aforesaid so long as said signal is being produced, third connections for maintaining said F1 receiver and F2 transmitter disabled and said F2 receiver and F1 transmitter enabled after said signal has been interrupted, means responsive to the removal of said instrument from said support for causing said third connections to function as aforesaid so long as said instrument remains removed from said support, fourth connections for preventing the above-described functioning of said third connections, said fourth connections including a timer for maintaining the above-described functioning thereof for at least a predetermined interval after said remote signal has been interrupted, means responsive to a signal received from a remote point when said signal is received prior to removal of said instrument from said support for causing said fourth connections to function as aforesaid for said interval, an indicator, fifth connections for actuating said indicator and means responsive to receipt of said remote signal for causing said fifth connections to function as aforesaid.

12. Communication apparatus comprising a first station having a first receiver designed to operate at frequency F1 and a first receiver designed to operate at frequency F2, which differs from F1, and a first transmitter designed to operate at said frequency F1 and first transmitter designed to operate at said frequency F2; a second station having a second F1 receiver, a a second F2 receiver, a second F1 transmitter and a second F2 transmitter; connections at each said stations enabling said first and second F1 receivers and said first and second F2 transmitters and disabling said first and second F2 receivers and said first and second F1 transmitters; a first locally actuable circuit at said first station responsive to a locally produced first signal for disabling said first F1 receiver and said first F2 transmitter and enabling said first F2 receiver and said first F1 transmitter and for transmitting a second signal over said first F1 transmitter; a second locally actuable circuit at said second station responsive to a locally produced third signal for disabling said second F1 receiver and said second F2 transmitter and enabling said second F2 receiver and said second F1 transmitter and for transmitting a fourth signal over said second F1 transmitter; a first remotely actuable circuit at said first station responsive to reception of said fourth signal for preventing actuation of said first locally actuable circuit; and a second remotely actuable circuit at said second station responsive to reception of said second signal for preventing actuation of said first locally actuable circuit.

13. Communication apparatus comprising a first station having a first receiver designed to operate at frequency F1 and a first receiver designed to operate at frequency F2, which differs from F1, and a first transmitter designed to operate at said frequency F1 and first transmitter designed to operate at said frequency F2; a second station having a second F1 receiver, a second F2 receiver, a second F1 transmitter and a second F2 transmitter; connections at each said stations enabling said first and second F1 receivers and said first and second F2 transmitters and disabling said first and second F2 receivers and said first and a second F1 transmitters; a first locally actuable circuit at said first station responsive to a locally produced first signal for disabling said first F1 receiver and said first F2 transmitter and enabling said first F2 receiver and said first F1 transmitter and for transmitting a second signal over said first F1 transmitter; a second locally actuable circuit at said second station responsive to a locally produced third signal for disabling said second F1 receiver and said second F2 transmitter and enabling said second F2 receiver and said second F1 transmitter and for transmitting a fourth signal over said second F1 transmitter; a first remotely actuable circuit at said first station responsive to reception of said fourth signal for preventing actuation of said first locally actuable circuit; for at least a predetermined time interval after receipt of said fourth signal has stopped, and a second remotely actuable circuit at said second station responsive to reception of said second signal for preventing actuation of said first locally actuable circuit for at least a predetermined time interval after receipt of said second signal has stopped.

14. Communication apparatus comprising a first station having a first receiver designed to operate at frequency F1 and a first receiver designed to operate at frequency F2, which differs from F1, and a first transmitter designed to operate at said frequency F1 and first transmitter designed to operate at said frequency F2; a second station having a second F1 receiver, a second F2 receiver, a second F1 transmitter and a second F2 transmitter; connections at each said stations enabling said first and second F1 receivers and said first and second F2 transmitters and disabling said first and second F2 receivers and said first and second F1 transmitters; a first locally actuable circuit at said first station responsive to a locally produced first signal both for disabling said first F1 receiver and said first F2 transmitter and enabling said first F2 receiver and said first F1 transmitter and for transmitting a second signal over said first F1 transmitter corresponding to said locally produced first signal; a second locally actuable circuit at said second station responsive to a locally produced third signal both for disabling said second F1 receiver and said second F2 transmitter and enabling said second F2 receiver and said second F1 transmitter and for transmitting a fourth signal over said second F1 transmitter corresponding to said locally produced third signal; a first remotely actuable circuit at said first station responsive to reception of said fourth signal for preventing actuation of said first locally actuable circuit; and a second remotely actuable circuit at said second station responsive to reception of said second signal for preventing actuation of said first locally actuable circuit.

15. A communication set including a first transmitter designed to operate at a frequency F1, a second transmitter designed to operate at a frequency F2 which differs from F1, a first receiver designed to operate at said F1 frequency, a second receiver designed to operate at said F2 frequency, stand-by connections enabling transmitter F2 and receiver F1 and disabling transmitter F1 and receiver F2, means for generating locally a signal having a predetermined characteristic and means responsive to said locally generated signal both for disabling transmitter F2 and receiver F1 and enabling transmitter F1 and receiver F2 and for transmitting a signal at frequency F1 having said predetermined characteristic.

16. In combination a first relay device; a second relay device; a timer, first terminals for connection to a power supply; a first circuit including said timer and said terminals adapted to be maintained closed by said relay devices only when both are in an unactuated state and to cause said timer to produce a timing operation; second terminals for connection to a power supply; a second circuit including said second terminals and said first relay device, said second circuit including means adapted to be closed by said timer when it performs a timing operation for actuating said first relay device; means for maintaining said first relay device actuated, once it is actuated, independently of said timer; mean for actuating said second relay device; and means responsive to said second relay device when it is actuated for interrupting the operation of said maintaining means.

ROBERT C. CHEEK.
PAUL L. NEWBURY.

REFERENCES CITED

The following references are of record in the file of this patent:

UNITED STATES PATENTS

| Number | Name | Date |
|---|---|---|
| 1,773,613 | Clark | Aug. 19, 1930 |
| 2,264,397 | Moore | Dec. 2, 1941 |
| 2,289,048 | Sandalls | July 7, 1942 |
| 2,294,905 | Honoman | Sept. 8, 1942 |
| 2,430,471 | Lang | Nov. 11, 1947 |
| 2,440,239 | Almquist | Apr. 27, 1948 |
| 2,481,915 | Edson | Sept. 13, 1949 |
| 2,484,211 | Emling | Oct. 11, 1949 |
| 2,507,116 | Moore | May 9, 1950 |
| 2,511,615 | Barstow et al. | June 13, 1950 |
| 2,511,616 | Barstow et al. | June 13, 1950 |
| 2,511,617 | Barstow | June 13, 1950 |